United States Patent [19]

Olez

[11] 4,291,081
[45] Sep. 22, 1981

[54] LACED COMPOSITE STRUCTURE

[75] Inventor: Nejat A. Olez, Rancho Palos Verdes, Calif.

[73] Assignee: Northrop Corporation, Hawthorne, Calif.

[21] Appl. No.: 60,896

[22] Filed: Jul. 26, 1979

[51] Int. Cl.³ .............................................. E04C 3/02
[52] U.S. Cl. .................................... 428/119; 52/729; 428/102
[58] Field of Search .................. 428/119, 120, 102; 52/63, 729, 730, 732

[56] References Cited

U.S. PATENT DOCUMENTS

| | | | |
|---|---|---|---|
| 799,391 | 9/1905 | Lee | 52/732 |
| 1,071,093 | 8/1913 | Russell | 52/730 X |
| 3,328,218 | 6/1967 | Noyes | 428/119 X |
| 3,328,931 | 7/1967 | Smith | 52/729 X |
| 3,579,411 | 5/1971 | Mackie et al. | 428/102 |
| 3,996,084 | 12/1976 | Holmes | 428/43 X |
| 4,113,910 | 9/1978 | Loyd | 428/119 X |
| 4,177,306 | 12/1979 | Schulz et al. | 428/119 X |
| 4,206,895 | 6/1980 | Olez | 428/116 X |

Primary Examiner—Henry F. Epstein
Attorney, Agent, or Firm—William M. Graham; William W. Rundle

[57] ABSTRACT

A lightweight composite structure including a continuous filament member laced through the structure to provide a plurality of tension members integral with the structure. The preferred method of manufacture is to layup and cure two or more composite structural members, such as "I" beams, with each cured "I" beam having a plurality of holes extended through its upstanding leg, its top and bottom T-cap portions. Next, an uncured composite skin panel is laced to the top T-cap portion of the "I" beams, utilizing the holes provided through the upstanding legs of the "I" beams. The laced composite structure is then cured using pressures and temperatures well known to those skilled in the art.

6 Claims, 4 Drawing Figures

4,291,081

LACED COMPOSITE STRUCTURE

BACKGROUND OF THE INVENTION

The present invention relates to composite structures and more particularly to high strength lightweight composite aircraft structures.

A particularly difficult problem encountered in the design of composite aircraft structures is weakness of the bond line in the direction of the skin lamination since it is this portion of the structure that tension and shear loads occurring normal to the skin-to-spar and skin-to-rib are carried totally by the resin or adhesive forming the bond line. The above identified weakness has, in the past, precluded bonded structures from being generally accepted as viable airfoil structures for high performance aircraft.

The present invention eliminates the problem of bondline failure in composite structures by lacings which are bonded in place and extend both through the skin panel and its supporting members to provide a plurality of tension and shear members which eliminate the total dependency on adhesives to carry both tension and shear loads along the bondlines.

DESCRIPTION OF THE PRIOR ART

The following patent is cited as the most pertinent prior art of which the Applicant is aware:

| U.S. Pat. No. | Name | Date |
|---|---|---|
| 3,996,084 | Richard N. Holmes | Dec. 7, 1976 |

The referenced patent (U.S. Pat. No. 3,996,084) discloses a panel having a face sheet and a base sheet of woven fabric which are interconnected with a core sheet alternately joined to the face sheet and base sheet. The face, base and core sheets are preimpregnated with resin and remain dry and flexible during joining and fabrication.

The cited patent is limited to the manufacture of panels and does not teach a method of manufacturing composite spars or ribs and the means for bonding the spars or ribs to a skin sheet to form a lightweight load-carrying aircraft structure, which normally has a fluid foil shape and/or a smooth radius of curvature.

While it is possible that more pertinent art exists, Applicant's search is believed to have been conducted with conscientious effort to locate and evaluate the closest prior art available at the time, but the statement is not to be construed as a representation that no better art exists.

SUMMARY OF THE INVENTION

The present invention relates to composite aircraft structure which is characterized by its capability to withstand high tension and shear loads occurring normal to the skin-to-spar and/or skin-to-rib bond line. The principal reason for this capability is that uncured, resin-impregnated, panels are laced to a fully cured supporting structure with lacings of resin-impregnated fiber strands made of materials such as graphite, rayon, boron, fiberglass, or Kevlar (Kevlar is the trade name for an inorganic fiber manufactured by DuPont) and the structure thus formed is cured while holding tension on the lacing. The structure thus formed provides a plurality of tension and shear members integral with the structure to transfer tension and shear loads from the outer surface of a skin panel to a structured member such as a rib or spar.

It is an object of the present invention to provide a method of bonding a skin panel to an aircraft structure in a way which eliminates the disadvantages of low reliability and low strength of the bondline in composite aircraft structures.

Another object of the present invention is to teach a means for bonding, in place, lacing which transfer tension and shear loads from the outer surface of a skin panel to structural members such as ribs and spars. These and other objects and advantages will become clearly apparent from the following detailed description and drawing, all of which is intended to be representative of rather than in any way limiting on the scope of the invention.

DESCRIPTION OF THE PREFERRED EMBODIMENT

Figure 1:
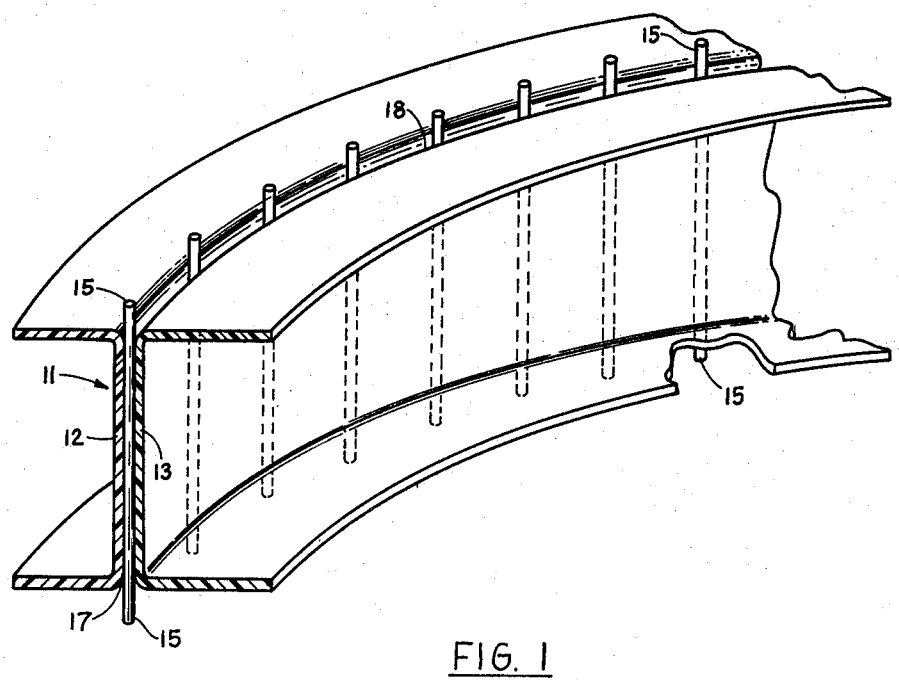
FIG. 1 is a fragmentary perspective view illustrating the fabrication of an "I" beam member used in the manufacture of the present invention.

FIG. 1 illustrates an "I" beam 11 made in accordance with the principles of the present invention. A preferred method of manufacturing the "I" beam 11 is to take a first and second C-shaped member 12 and 13 respectively made of uncured bidirectional fabric, preferably of graphite or boron impregnated with any suitable resin or epoxy polyester, and place them on each side of a plurality of metal pins 15 which are coated with a suitable parting agent (not shown). The assembly thus formed is then vacuum-bagged and cured using suitable pressures and temperatures well known to those skilled in the art.

After the "I" beam 11 is cured, the metal pins 15 are removed and provide the "I" beam 11 with a plurality of holes 17 which extend through a center bondline 18 located betwen the abutting surfaces of the C-shaped members 12 and 13.

Figure 2:
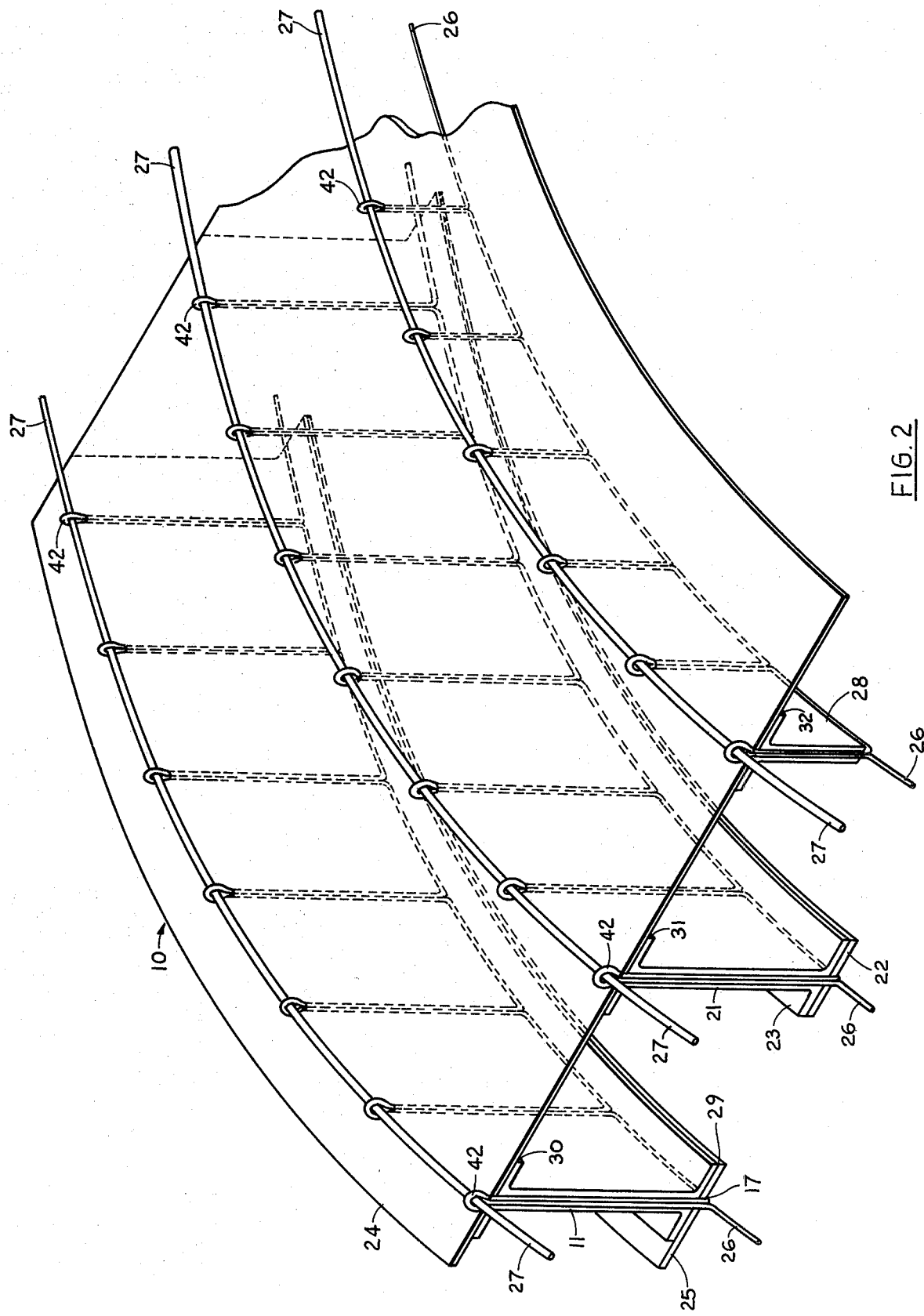
FIG. 2 is a fragmentary perspective view illustrating the fabrication of a composite structure made in accordance with the present invention.

Referring now to FIG. 2, the reinforced "I" beam 21 is substantially the same as the "I" beam 11; the difference being that before the curing process, a fabric 22 is adhesively attached to the lower flanges 23 of the reinforced "I" beam 21.

The preferred method used in the manufacture of the T-shaped stiffener 28 is to first insert a plurality of the metal pins 15 (shown in FIG. 1) through a strip of uncured graphite or boron epoxy fabric. The fabric is then folded around the metal pins 15 and into the form of the T-shaped stiffener 28. The assembly thus formed is vacuum-bagged and cured using pressures and temperatures well known to those in the art. After curing, the metal pins 15 are removed completing the manufacture of the T-shaped stiffener 28.

The contoured lightweight structure 10 illustrated is a section of a somewhat typical aircraft airframe made in accordance with the principles of the present invention. The structure 10 comprises the "I" beam 11 interposed between and tension laced to an upper and lower skin panel 24 and 25 of bidirectional resin impregnated graphite cloth or fabric with a loop lacing 26 and a shuttle lacing 27 formed from a high-strength filamentary member such as resin-impregnated graphite, rayon, boron, fiberglass or Kevlar strands.

The reinforced "I" beam 21 and the T-shaped stiffener 28 are also tension laced to the upper skin panel 24 with the loop lacing 26 and the shuttle lacing 27. It is the lacings 26 and 27 that provide the additional shear and tension strength to the skin panels 24 and 25 at bondlines 29, 30, 31 and 32 respectively.

Figure 3:
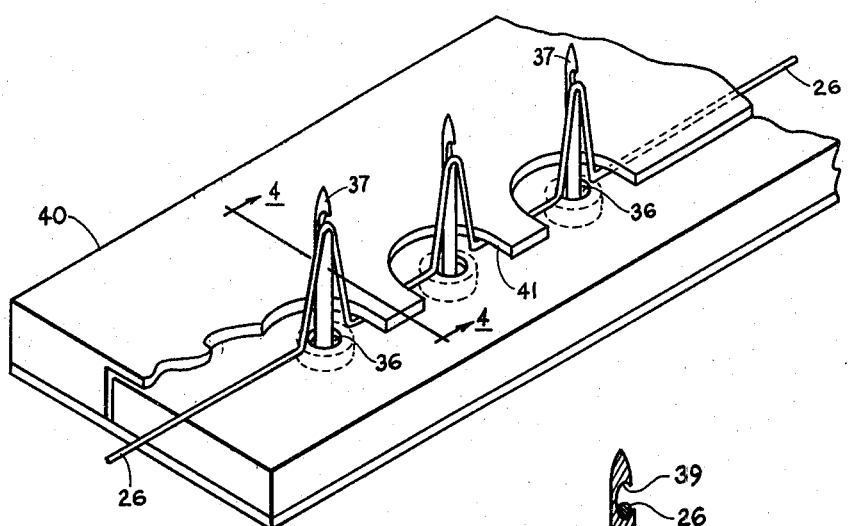
FIG. 3 is a fragmentary perspective view illustrating one form of tool useful in practicing the present invention.
Figure 4:
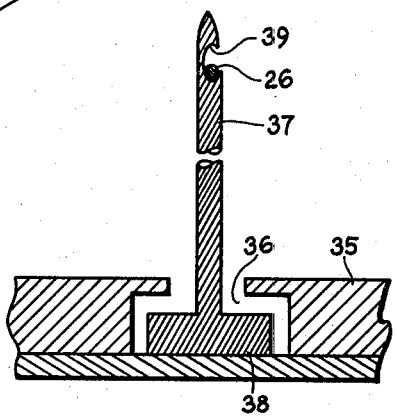
FIG. 4 is an enlarged fragmentary view of one of the needles of FIG. 3 useful in practicing the present invention.

One form of tool for performing the tension-lacing is shown in FIG. 3 wherein a bolster plate 35 is provided with a number of counter bores 36 arranged in a straight line. A like number of needles 37 having collar members 38 at one end thereof are loosely held in the counter bores 36. The opposite ends of the needles 37 are notched to define detents 39, as shown in FIG. 4, to hold the loop lacing 26 in position during the lacing operation.

A spreader member 40, which is provided with a corresponding number of U-shaped openings 41, extends over the bolster plate 35 so that each opening 41 surrounds a needle 37 to maintain appropriate spacing of the loop lacing 26.

The loop lacing 26 is installed in the tool by alternately threading the lacing 26 under the spreader 40 and over the needle 37 somewhat as shown in FIG. 3. In lacing the "I" beam 11 to the upper and lower skin panels 24 and 25, the tool is brought into contact, in any convenient manner, with lower skin panel 25 opposite the holes 17 of the "I" beam 11 forcing the needles 37 carrying the loop lacing 26 through the lower skin panel 25, the "I" beam 11 and the upper skin panel 24 where the lacing 26 is left as a loop 42 (shown in FIG. 2) after the needles 37 are withdrawn, the loops 42 being defined by the loop lacing 26 doubled back upon itself along the extent of the "I" beam 11 substantially as shown.

Referring again to FIG. 2, after the loops 42 are formed, the shuttle lacing 27 is passed therethrough and tension exerted and held by any convenient means, on both the loop lacing 26 and the shuttle lacing 27 while the structure 10 is cocured.

While the present invention has been described in language more or less specific as to materials and structural features, it is to be understood that the invention is not limited to the specific features and materials disclosed and the invention is, therefore, claimed in any of its forms or modifications within the legitimate and valid scope of the appended claims.

I claim:
1. A bonded joint comprising, in combination:
    a. at least one skin panel;
    b. two upstanding members having abutting surfaces bonded side by side, and flanges which are bonded to said skin panel forming said bonded joint; and
    c. lacing, cocured under tension, extending through said panel and between said abutting surfaces of said upstanding members through a plurality of holes provided between said abutting surfaces to transfer tension and shear loads occurring normal to said skin panel into and through said upstanding members.
2. The bonded joint of claim 1 wherein said lacing is made of a resin impregnated filamentary member.
3. The bonded joint of claim 1 wherein said upstanding members are T-shaped.
4. The bonded joint of claim 1 wherein said upstanding members are I-shaped.
5. The bonded joint of claim 4 wherein said upstanding members are made of resin impregnated bi-directional fabric.
6. The "T" shaped member of claim 3 wherein said "T" shaped member is made from one strip of folded fabric.

* * * * *